United States Patent
Sarshogh et al.

(10) Patent No.: US 11,023,767 B2
(45) Date of Patent: *Jun. 1, 2021

(54) SYSTEMS AND METHODS FOR TEXT LOCALIZATION AND RECOGNITION IN AN IMAGE OF A DOCUMENT

(71) Applicant: CAPITAL ONE SERVICES, LLC, McLean, VA (US)

(72) Inventors: Mohammad Reza Sarshogh, Arlington, VA (US); Keegan Hines, Washington, DC (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/858,124

(22) Filed: Apr. 24, 2020

(65) Prior Publication Data

US 2020/0250459 A1 Aug. 6, 2020

Related U.S. Application Data

(63) Continuation of application No. 16/457,346, filed on Jun. 28, 2019, now Pat. No. 10,671,878.

(Continued)

(51) Int. Cl.
*G06K 9/46* (2006.01)
*G06K 9/62* (2006.01)
*G06K 9/32* (2006.01)

(52) U.S. Cl.
CPC ............ *G06K 9/46* (2013.01); *G06K 9/3233* (2013.01); *G06K 9/6256* (2013.01); *G06K 9/6262* (2013.01); *G06K 2209/01* (2013.01)

(58) Field of Classification Search
CPC ............ G06K 2209/01; G06K 9/3233; G06K 9/4628; G06K 9/6256; G06K 9/627; G06K 9/6262; G06K 9/46
See application file for complete search history.

(56) References Cited

U.S. PATENT DOCUMENTS 10,032,072 B1 7/2018 Tran et al.
10,360,069 B2 * 7/2019 Bequet ................... H04L 67/12
(Continued)

FOREIGN PATENT DOCUMENTS

| CN | 109614985 A | 4/2019 |
| WO | 2017079522 A1 | 5/2017 |
| WO | 2019108252 A1 | 6/2019 |

OTHER PUBLICATIONS

Hua, Xia, et al. "A fast self-attention cascaded network for object detection in large scene remote sensing images." Applied Soft Computing 94 (2020): 106495. (Year: 2020).*

*Primary Examiner* — Pinalben Patel
(74) *Attorney, Agent, or Firm* — Bookoff McAndrews, PLLC

(57) ABSTRACT

Disclosed are methods, systems, and non-transitory computer-readable medium for localization and recognition of text from images. For instance, a first method may include: receiving an image; processing the image through a convolutional backbone to obtain feature maps(s); processing the feature maps through a region of interest (RoI) network to obtain RoIs; filtering the RoIs through a filtering block to obtain final RoIs; and processing the final RoIs through a text recognition stack to obtain predicted character sequences for the final RoIs. A second method may include: constructing a text localization and recognition neural network (TLaRNN); obtaining training data; training the TLaRNN on the training data; and storing trained weights of the TLaRNN. The constructing the TLaRNN may include: connecting a convolutional backbone to a region of interest (RoI) network; connecting the RoI network to a filtering block; and connecting the filtering block to a text recognition network.

20 Claims, 10 Drawing Sheets

Related U.S. Application Data

(60) Provisional application No. 62/791,535, filed on Jan. 11, 2019.

(56) References Cited

U.S. PATENT DOCUMENTS

| | | |
|---|---|---|
| 10,445,611 B1 | 10/2019 | Kim et al. |
| 10,671,878 B1 * | 6/2020 | Sarshogh ............... G06K 9/627 |
| 2017/0098140 A1 | 4/2017 | Wang et al. |
| 2018/0096457 A1 * | 4/2018 | Sawides ................. G06F 16/50 |
| 2018/0137350 A1 | 5/2018 | Such et al. |
| 2019/0073353 A1 | 3/2019 | Yu et al. |
| 2019/0130204 A1 | 5/2019 | Li et al. |
| 2019/0171870 A1 | 6/2019 | Vajda et al. |

\* cited by examiner

```
                DICK'S SPORTING GOODS    TEXT 0.997
                    N CAMBUTH, NH        TEXT 0.974
       TEXT 1.000  (503) 431 8035
       TEXT 1.000  07/27/17     5:59 PM  TEXT 1.000
             RECEIPT EXPIRES ON 07/28/17 TEXT 0.979

S-00234 R-2     T-9137 A-0435009 SALE TEXT 0.998
        TEXT 0.973
        Your associate today is: Samuel  TEXT 0.996

Customer copy  TEXT 1.000                    315

TEXT 0.994     TEXT 1.000     TEXT 1.000
          130325150556   590TRAILNA78   50.29

ITEM TOTAL                TEXT 1.000 54.99       304
        SUBTOTAL  TEXT 1.000      TEXT 1.000 54.99
                                                         302A
        TOTAL  TEXT 1.000    TEXT 1.000  $54.99
                                                         306

MASTERCARD  TEXT 1.000   TEXT 1.000 $54.99
        TEXT  ACCOUNT# **********3129 TEXT 0.990
        0.0996 AUTH: 004727 TEXT 1.000
        INSERTED TEXT 1.000
        AID: A000000000010 TEXT 0.0999
        TVR: 0000008000 TEXT 0.0998      TEXT 0.845
        IAD: 0110A0000122000000000000000000
        001H TEXT 1.000
        TSI: 680M TEXT 0.999
        APP: MASTERCARD TEXT 1.000
        ARC: 00 TEXT 1.000
        CHANGE DUE TEXT 1.000      TEXT 0.991 0.00
```

*FIG. 3C*

SYSTEMS AND METHODS FOR TEXT LOCALIZATION AND RECOGNITION IN AN IMAGE OF A DOCUMENT

CROSS-REFERENCE TO RELATED APPLICATION(S)

This patent application is a continuation of U.S. patent application Ser. No. 16/457,346, filed on Jun. 28, 2019, which claims the benefit of priority to U.S. Provisional Application No. 62/791,535, filed Jan. 11, 2019, the entireties of which are incorporated herein by reference

TECHNICAL FIELD

Various embodiments of the present disclosure relate generally to systems and methods for extraction of text from images and, more particularly, to systems and methods for extraction of text from images using a text localization and recognition neural network.

BACKGROUND

Many companies and individuals are inundated with many documents (e.g., thousands of documents) to process, analyze, and transform in order to carry out day-to-day operations. Some examples of such documents may include receipts, invoices, forms, statements, contracts, and many more pieces of unstructured data. It may be important to be able to quickly understand the information embedded within unstructured data in these documents.

The extraction of text from images may be thought of as a two-step problem: text localization followed by text recognition. In the first part, a model may identify which areas of an image correspond to text. The second part may then involve recognizing text (predicting the character sequence) for each of those image segments. The problem of text localization may share many features in common with the more general task of object detection.

The challenge of extracting text from images of documents has traditionally been referred to as Optical Character Recognition (OCR). When documents are clearly laid out and have a global structure (for example, a business letter), existing tools for OCR may perform well.

There are, however, many use cases that may be referred to as non-traditional OCR. One such non-traditional OCR use case may include detecting arbitrary text from images of natural scenes. Problems of this nature may be formalized in the COCO-Text challenge in which the goal is to extract text that might be included in road signs, house numbers, advertisements, and so on.

Another area that may present a similar challenge is in text extraction from images of complex documents. In contrast to documents with a global layout (such as a letter, a page from a book, a column from a newspaper), many types of documents (hereinafter called "complex documents") are relatively unstructured in their layout and have text elements scattered throughout (such as, for example, receipts, forms, and invoices). Furthermore, text extraction from complex documents may present different problems than traditional OCR and natural scenes. For instance, in contrast to traditional OCR, complex documents may not be laid out in a clear fashion; and in contrast to natural scenes, complex documents may not have a small number of relatively large text boxes to be extracted from images and video. Specifically, complex documents may need to detect a large number of relatively small text objects in an image. Further, the text objects may be characterized by a large variety of lengths, sizes, and orientations.

Problems in text extraction from complex documents have been recently formalized in the ICDAR DeTEXT Text Extraction from Biomedical Literature Figures challenge. Images for complex documents are characterized by complex arrangements of text bodies scattered throughout a document and surrounded by many "distractions" objects. In these images, a primary challenge lies in properly segmenting objects in an image to identify reasonable text blocks.

Collectively, these regimes of non-traditional OCR pose unique challenges. Some challenges may include background/text separation, font-size variation, coloration, text orientation, text length diversity, font diversity, distraction objects, and occlusions.

FIG. 1A depicts exemplary input images 100 and 105 of image recognition systems. In the images 100/105, the challenge may be to detect text objects 100A/105A as separate from background pixels and other distractions 100B/105B.

FIG. 1B depicts an exemplary output image of image recognition systems. Specifically, image 110 is an output of Mask R-CNN, which is an object detection algorithm. Mask R-CNN is an example of a multi-task network: with a single input (e.g., image), the model must predict multiple kinds of outputs. Specifically, Mask R-CNN is split into three "heads," where a first head is concerned with proposing bounding boxes that likely contain objects of interest, a second head is concerned with classifying which type of object is contained within each box, and the third head predicts high quality segmentation mask for each box. Importantly, all three of the heads rely upon a shared representation that is calculated from a deep convolutional backbone model, such as a residual neural network (ResNet). Furthermore, Mask R-CNN also uses a pooling mechanism called RoIAlign. Previous models to Mask R-CNN relied on less accurate estimation of boundary values during the pooling process mechanisms (e.g., RoIPool), which inevitably adds too much noise to predict segmentation mask. To overcome this, RoIAlign uses interpolation methods to accurately align feature maps with input pixels. For instance, RoIPool may divide large resolution feature maps to smaller feature maps by quantization, thereby creating misalignment on boundaries (e.g., because of a rounding operation). RoIAlign may avoid the misalignment problem, but RoIAlign may still not retain high spatial resolution information (e.g., because RoIAlign may calculate values of sample locations directly through bilinear interpolation), and high spatial resolution information may be needed for high accuracy text recognition.

In the image 110, Mask R-CNN tries to accomplish three things: object detection (indicated by boxes 110A), object classification (indicated by text-string 110C), and segmentation (indicated by regions 110B).

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, systems and methods are disclosed for text localization and recognition from images.

For example, a method for training a text localization and recognition neural network (TLaRNN) may include: constructing a TLaRNN; obtaining/generating training data; training the TLaRNN on the training data; and storing the trained weights of the TLaRNN. The constructing the TLaRNN may include: designing a convolutional neural network backbone; connecting the convolutional neural network backbone to a region of interest (RoI) network; connecting the RoI network to an RoI filtering block; and connecting the filtering block to a text recognition network.

A system for extraction of text from images may include: a memory storing instructions; and a processor executing the instructions to perform a process. The process may include: receiving an image; processing the image through a convolutional backbone to obtain feature maps; processing the feature maps through a region of interest (RoI) network to obtain RoIs; filtering the RoIs through a filtering block, based on some predefined threshold on model's confidence, to obtain final RoIs; and processing the final RoIs through a text recognition network to obtain predicted character sequences for the final RoIs.

A method for extraction of text from images may include: receiving an image; processing the image through a convolutional backbone to obtain feature maps(s); processing the feature maps through a region of interest (RoI) network to obtain RoIs; filtering predicted RoIs based on the prediction confidence to obtain final RoIs; and processing the final RoIs through a text recognition stack to obtain predicted character sequences for the final RoIs, wherein the convolutional backbone includes, in series, a first convolutional stack and a feature pyramid network, wherein the RoI network includes, in series, a region proposal network and a bounding box regression/classifier network, the bounding box regression/classier network includes, in parallel, a bounding box regression head and a classifier head, wherein the filter block includes an RoI filtering logic based on classifier confidence and some predefined threshold, and wherein the text recognition network includes, in series, a feature extraction mechanism and a text recognition stack.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 3A-3D depict output results of a text localization and recognition neural network for extraction of text from images, according to one or more embodiments.

DETAILED DESCRIPTION OF EMBODIMENTS

Figure 1A:
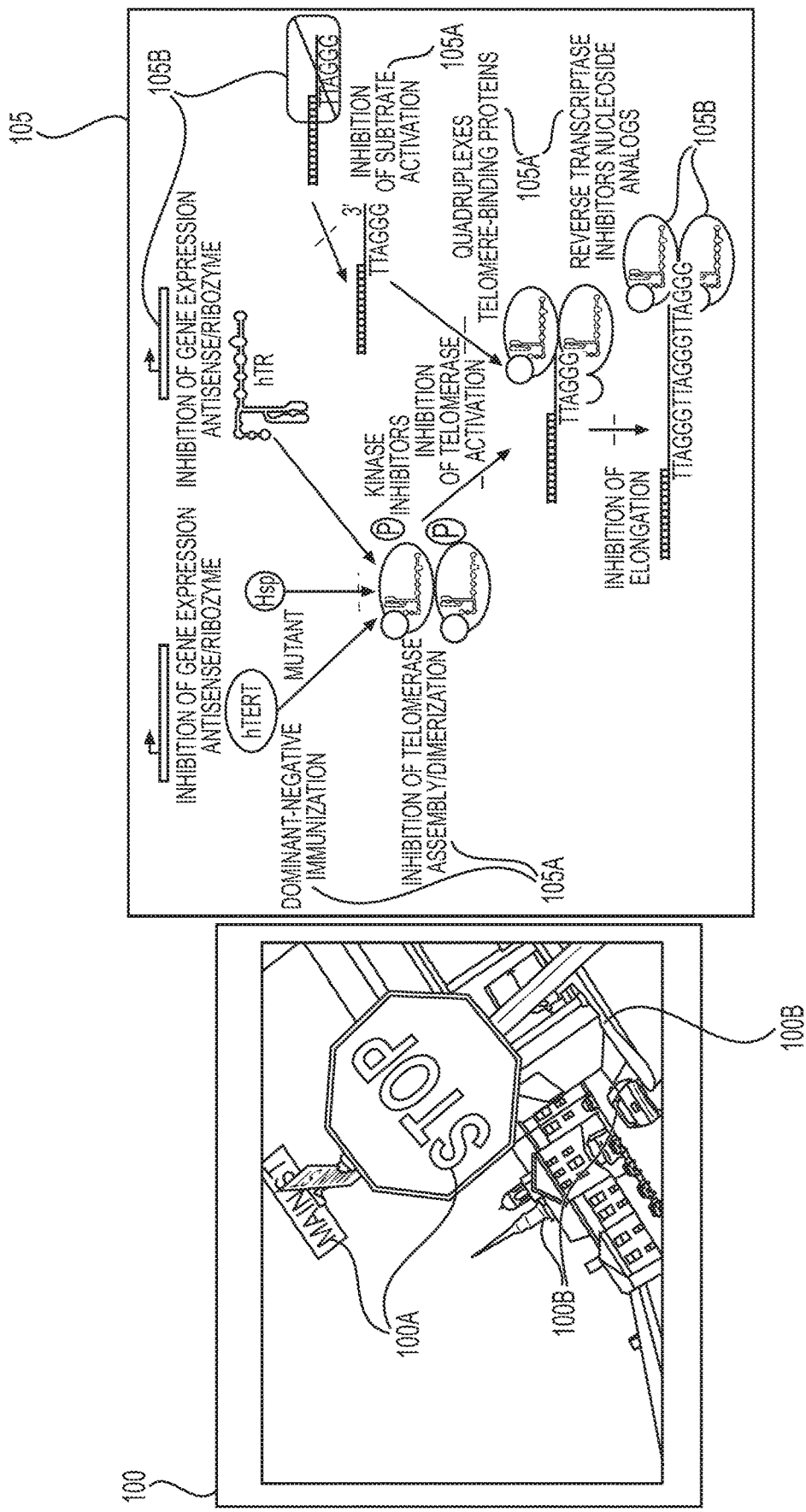
FIGS. 1A and 1B depict exemplary input and output images of image recognition systems.
Figure 1B:
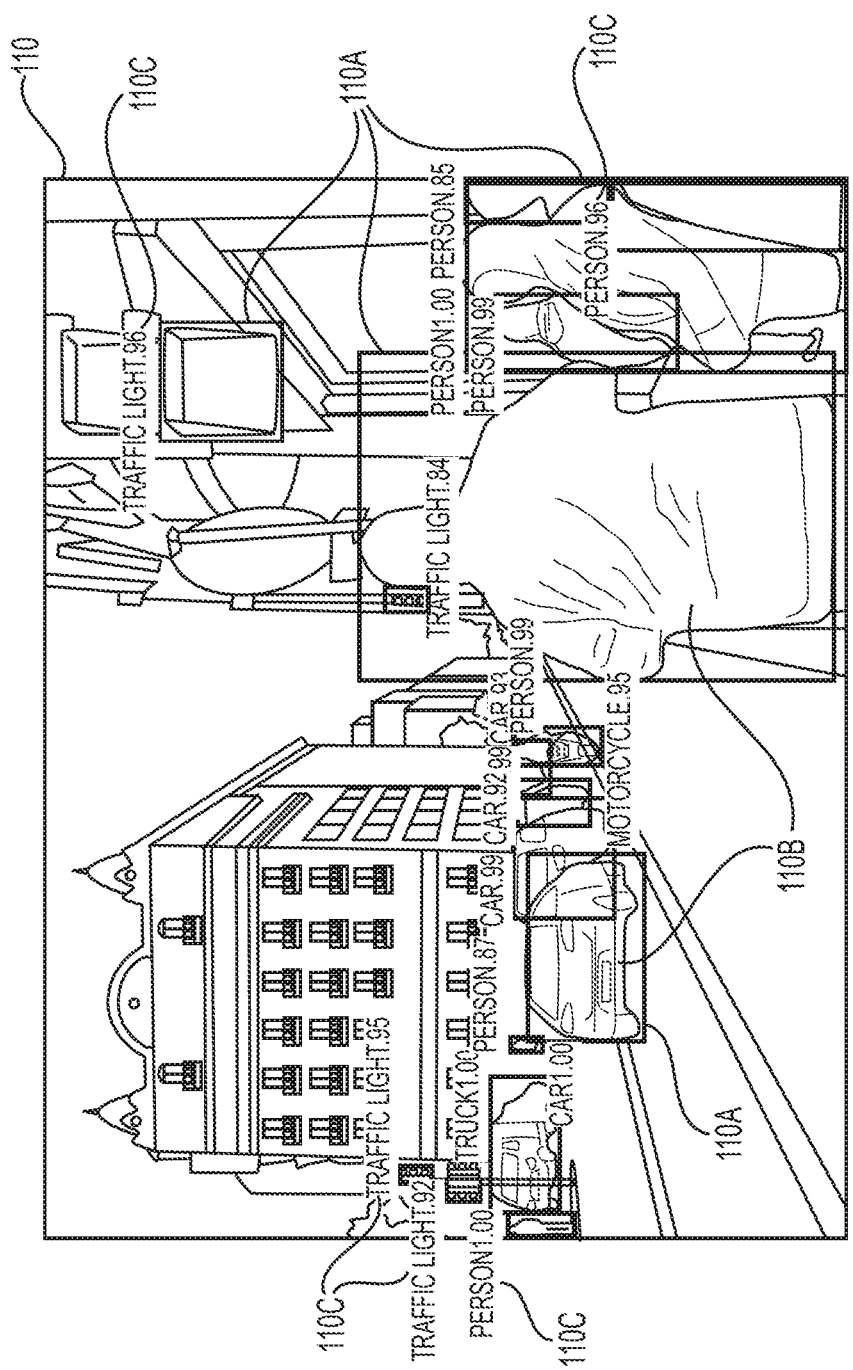

Various embodiments of the present disclosure relate generally to extraction of text from images.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion, such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In general, the present disclosure is directed to systems and methods for extraction of text from images using a text localization and recognition neural network. As discussed in more detail below, the present disclosure describes an end-to-end trainable text localization and recognition neural network that may address a problem of text extraction from images of complex documents and/or natural scenes (e.g., camera images of receipts, invoices, forms, statements, contracts, etc. that may also include background environment features). The TLaRNN simultaneously may solve the problems of text localization and text recognition, and the TLaRNN may identify text segments with no post-processing, cropping, or word grouping. The TLaRNN may include a convolutional backbone and a feature pyramid network to provide a shared representation that benefits each of three sub-task heads: text localization, text/background classification, and text recognition. To improve recognition accuracy, the text localization and recognition neural network may use a dynamic pooling mechanism that retains high-resolution information across all regions of interest (RoIs). For text recognition, the TLaRNN may use an attentional mechanism to improve the accuracy. Furthermore, the TLaRNN may be evaluated against multiple benchmark datasets and comparable methods, and the TLaRNN may achieve a high performance in challenging regimes of non-traditional OCR.

Figure 2A:
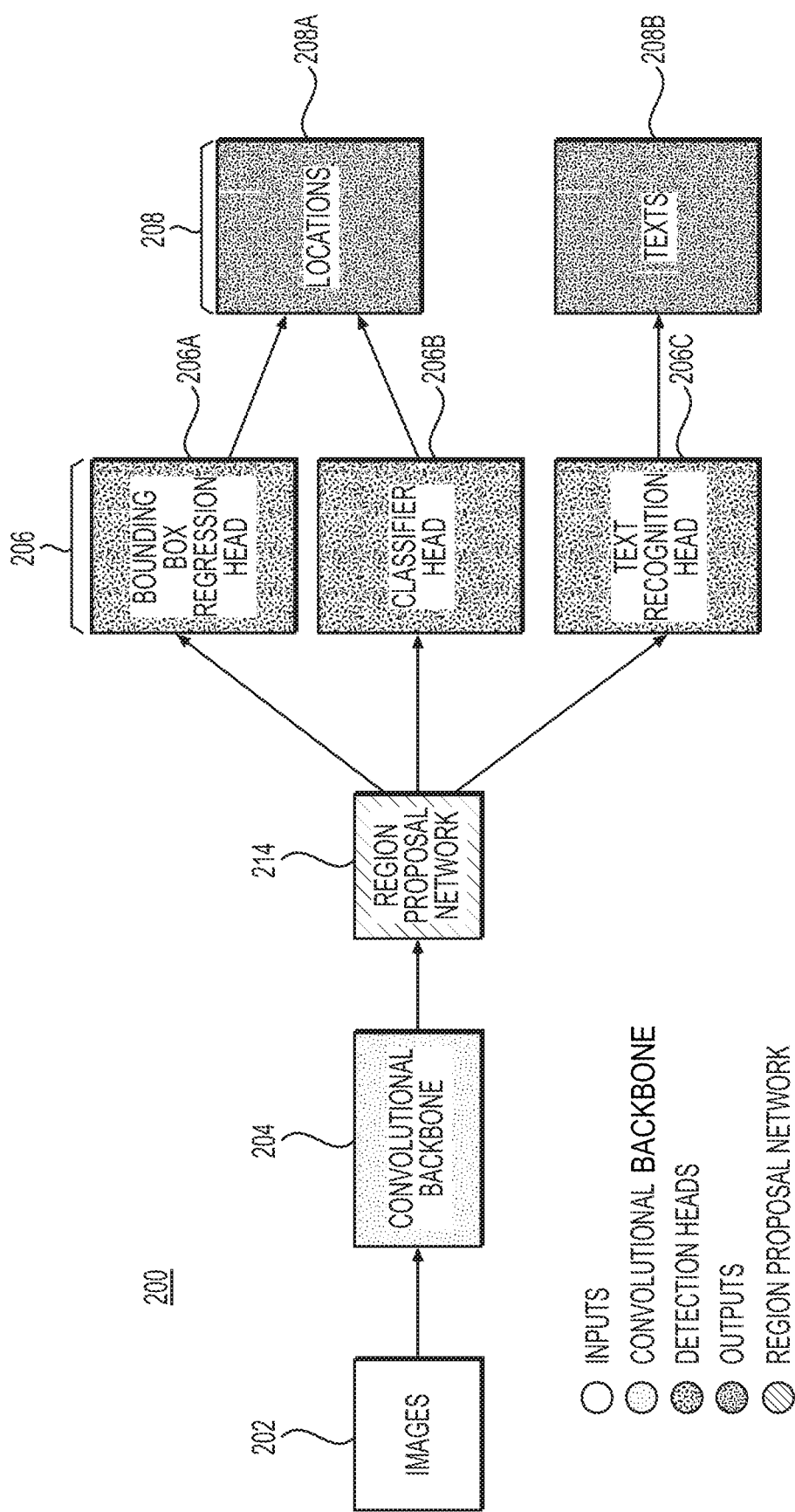
FIG. 2A depicts an exemplary block diagram of a system for text localization and recognition out of images, according to one or more embodiments.

FIG. 2A depicts an exemplary block diagram of a system 200 for text localization and recognition out of images, according to one or more embodiments. The system 200 may include a memory storing a text extraction program, and a processor executing the text extraction program to perform a text localization and recognition process from one or more images 202. The text extraction program may process a TLaRNN. The TLaRNN may include a convolutional backbone 204, a region proposal network 214, detection heads 206, and outputs 208. The system 200 may receive images 202 to be input to the convolutional backbone 204.

In one aspect of the disclosure, the convolutional backbone 204 may include a convolutional stack and a feature pyramid network. The system 200 may input the images 202 to the convolutional backbone 204. The output of the convolutional backbone 204 may be one or more feature map(s). The feature map(s) may be input into the region proposal network 214 and the detection heads 206. The feature map(s) of the convolutional backbone 204 may be representations that are then used by the detection heads 206 in order to identify text locations 208A and text 208B of output 208.

The convolutional stack of the convolutional backbone 204 may be a ResNet, a Densely Connected Convolutional Networks (DenseNet), or a customized DenseNet. A DenseNet may lead to higher accuracy than a ResNet. The images 202 may be input to the convolutional stack of the convolutional backbone 204. The output of the convolutional stack may be convolutional feature maps. The convolutional feature maps may be input into the Feature Pyramid Network of the convolutional backbone 204. In convolutional stack of the convolutional backbone 204, the features extracted from earlier (closer to the input) in the network tend to have high spatial resolution (dense locational details), but have semantically weak features (less relational information about different parts of an image). In contrast, the features extracted from deeper (farther from the input) in the network have lost much of the locational information (low spatial resolution), but they have dense relational information about distant parts of an image (semantically strong features). The Feature Pyramid Network may construct a top-down architecture that merges the strong features of higher levels of the convolutional stack with the lower ones. In this way, the accuracy of Region Proposal Network will be increased. The output of the Feature Pyramid Network of the convolutional backbone 204 may be one or more pyramid feature map(s). The pyramid feature map(s) may be input to the detection heads 206.

The region proposal network 214 may receive the output of the Feature Pyramid Network as an input (e.g., receives the pyramid feature maps), and the region proposal network may output proposals (e.g., a matrix of all the RoIs of six (6) numbers: two (2) scores, and four (4) coordinates of top and bottom corners for each RoI).

The detection heads 206 may include three sub-task heads: a bounding box regression head 206A, a classifier head 206B, and a text recognition head 206C. The proposals and some/all of the pyramid feature maps may be input to the bounding box regression head 206A and the classifier head 206B. Collectively, the bounding box regression head 206A and the classifier head 206B may be called a "text localization head." The bounding box regression head 206A and the classifier head 206B may output the text locations 208A, and the text recognition head 206C may output the text 208B.

The region proposal network may receive the output of the convolutional backbone 204 (e.g., the pyramid feature map(s)). The region proposal network 214 may output the proposals using anchors and a sliding window.

The bounding box regression head 206A may be a bounding box regression network, and the bounding box regression head 206A may receive the proposals from the region proposal network and feature map(s) from Feature Pyramid Network as inputs. The bounding box regression head 206A may output a set of predicted boxes (RoIs) that may contain text. The RoIs may include coordinates of the predicted boxes. The classifier head 206B may be a neural network that estimates the probability of containing a text for each region proposal. The second stage may also include an RoI filtering block. The RoI filtering block may receive the RoIs from the bounding box regression head 206A and the probabilities from the classifier head 206B. The RoI filtering block may select one or more RoIs, as discussed below.

The text recognition head 206C may be a neural network. The text recognition head 206C may receive the output of the convolutional backbone 204 (e.g., the convolutional feature map(s)) and the RoIs from the text localization head (e.g., from the bounding box regression head 206A and/or from the RoI filtering block). The text recognition head 206C may, for each RoI, produce a predicted sequence of characters corresponding to the text inside each RoI. The TLaRNN may use a CTC loss for training the text recognition head 206C.

In Mask R-CNN (an object detection model), large objects are separated from small ones by pooling features of larger objects from the top of the feature pyramid (farther from input), and pooling features of small objects from the bottom of the pyramid (closer to the input). Since top levels of the feature pyramid have greater strides, it may be sufficient to resize extracted features for all the objects to the same dimensions. However, to distinguish different characters in an image, high spatial resolution details may need to be available in the feature maps. Thus, text recognition may place a more stringent requirement on feature representation than is required for object detection alone. As a result, the previously used techniques of pooling the features of larger object (texts) from the top of feature pyramid may not be applied here. This may result in low spatial resolution information and may degrade the model ability to accurately recognize the characters. Considering these challenges, RoI-reclign (RoI Recognition Align) was designed to pool the features of every RoI in text recognition head 206C, no matter how big or small, from the bottom of the feature pyramid. This was chosen to retain the high spatial resolution information that would be required to accurately recognize the characters of localized texts. Further, for text recognition, there is the problem of diverse text aspect ratios as we do not want our pooled representation to be corrupting text features by stretching short texts and compressing long ones. That is why RoIreclign may dynamically resize and pad all RoIs into a fixed shape to retain their aspect ratio.

Additionally, the text recognition head 206C may be implemented using various neural networks and techniques. For instance, one technique may be to crop the input image, as identified by the RoIs (RoI filtering block outputs), then process the cropped image through a multilayer perceptron (e.g., RNN or CNN stacks). However, such a technique does not use image feature maps, extracted by the convolutional backbone 204, and shared between the detection heads 206, which may require the text recognition head 206C to do more computation on its own to generate the required feature maps. Instead, the text recognition head 206C may proceed by pooling the features of every identified RoI from the convolutional backbone 204 (feature map RoIs). Each of the feature map RoIs may then be transformed into a fixed shape and the text recognition can proceed.

For the text recognition head 206C, one possible technique for sequence classification and sequence labelling may be to use an RNN that sequentially processes across the horizontal steps of every RoI's pooled features to predict an output label for each horizontal step. However, this technique may be insufficient for text recognition due to the fact that long-range correlations may not be required in order to recognize the character sequence of a text. Instead, the text recognition head 206C may only need to look at a few "feature columns" at a time in order to get a sense of which character is being represented. Therefore, the text recognition head 206C may use a convolutional neural network with a kernel that covers multiple (e.g., two, three, four, etc.) feature columns at each step. When the text recognition head 206C uses a convolutional neural network with the kernel, the text recognition head 206C may, at each horizontal step, use the output of convolutions to predict an output character (e.g., letter, number, symbol, etc.); then the overall sequence is collapsed through a connectionist temporal classification (CTC) layer to output the final character sequence of every RoI.

In order to train the TLaRNN, a large number of labeled data may be required. However, in lieu of tagging and generating labeled images manually, synthetic training documents may be generated. Specifically, to generate the synthetic training dataset, the system 200 (or another computer and/or software program) may randomize fonts, font sizes, colors, distractions objects, and so on, to create variability in the synthetic training documents. With enough variability, the TLaRNN may generalize enough to be able to perform well on real-world images. For instance, as discussed below, ten thousand synthetic training documents may lead to strong performance on the real-world images.

Generally, the various neural networks or heads discussed herein may be specifically configured neural networks. A neural network may have one or more hidden layers of nodes, in addition to an input layer of nodes, and an output layer of nodes. The number of hidden layers may depend on the particular implementation, and may be, for example, 2 or more, 5 or more, 10 or more, 25 or more, 50 or more, 100 or more, etc. The number of nodes within each layer, and the number of total nodes in the neural network may depend on the particular implementation. For example, the number of total nodes in the one or more hidden layers may be 5 or more, 10 or more, 50 or more, 100 or more, 500 or more, etc. The number of nodes in the input and output layers may depend on the input variables and desired output of the particular implementation. In the neural network, each node of each layer before the output layer may have a connection to each node of the next layer, and may have a respective weight for each of the connections to the nodes of the next layer. Alternatively, each node of each layer before the output layer may have a connection to one or more node(s) of the next layer, and may have a respective weight for each of the connections to the nodes of the next layer. For example, if a first hidden layer includes nodes $a_1$, $a_2$, $a_3$, $a_4$, and $a_5$, and the next layer includes nodes $b_1$, $b_2$, $b_3$, and $b_4$, then the node $a_1$ may have weights $w_{a1b1}$, $w_{a1b2}$, $w_{a1b3}$, and $w_{a1b4}$, respectively corresponding to its connections to nodes $b_1$, $b_2$, $b_3$, and $b_4$. Likewise, the node $a_2$ may have weights $w_{a2b1}$, $w_{a2b2}$, $w_{a2b3}$, and $w_{a2b4}$, respectively corresponding to its connections to nodes $b_1$, $b_2$, $b_3$, and $b_4$. The weights of a node may be used as a multiplier to the output of the node for purposes of input into the following node. In the example discussed above, the outputs of the first hidden layer nodes $a_1$, $a_2$, $a_3$, $a_4$, and $a_5$ into node $b_1$ may be respectively multiplied by weights $w_{a1b1}$, $w_{a2b1}$, $w_{a3b1}$, $w_{a4b1}$, and $w_{a5b1}$, to obtain weighted outputs. The weighted output may be used as an input parameter for a function that determines or affects the output of node $b_1$. For example, the weighted outputs may be summed, and the sum may be input into an activation function of the node $b_1$. The activation function of the node $b_1$, as well as any other node, may be any suitable function, such as a sigmoidal function, a logistic function, a hyperbolic tangent function, or a rectified linear unit function, etc.

Furthermore, generally, when a neural networks' architecture is discussed, it refers to all the decisions a modeler may make, such as: what are the inputs, what basic blocks (e.g., CNN, RNN, Dense layer etc.) to use, forward pass (how information moves from inputs to the outputs), what kind of nonlinear function to use, how to regularize the model (dropout, batch normalization etc.), what loss function to use, etc. In the TLaRNN, all of the components may be either completely changed or tailored for text localization and recognition of an image of a complex document.

While certain characteristics of a neural network have been discussed above for purposes of illustration, it is understood that the neural network to which methodologies of this disclosure may be applied may have any characteristic of neural networks now known or later developed.

Figure 2B:
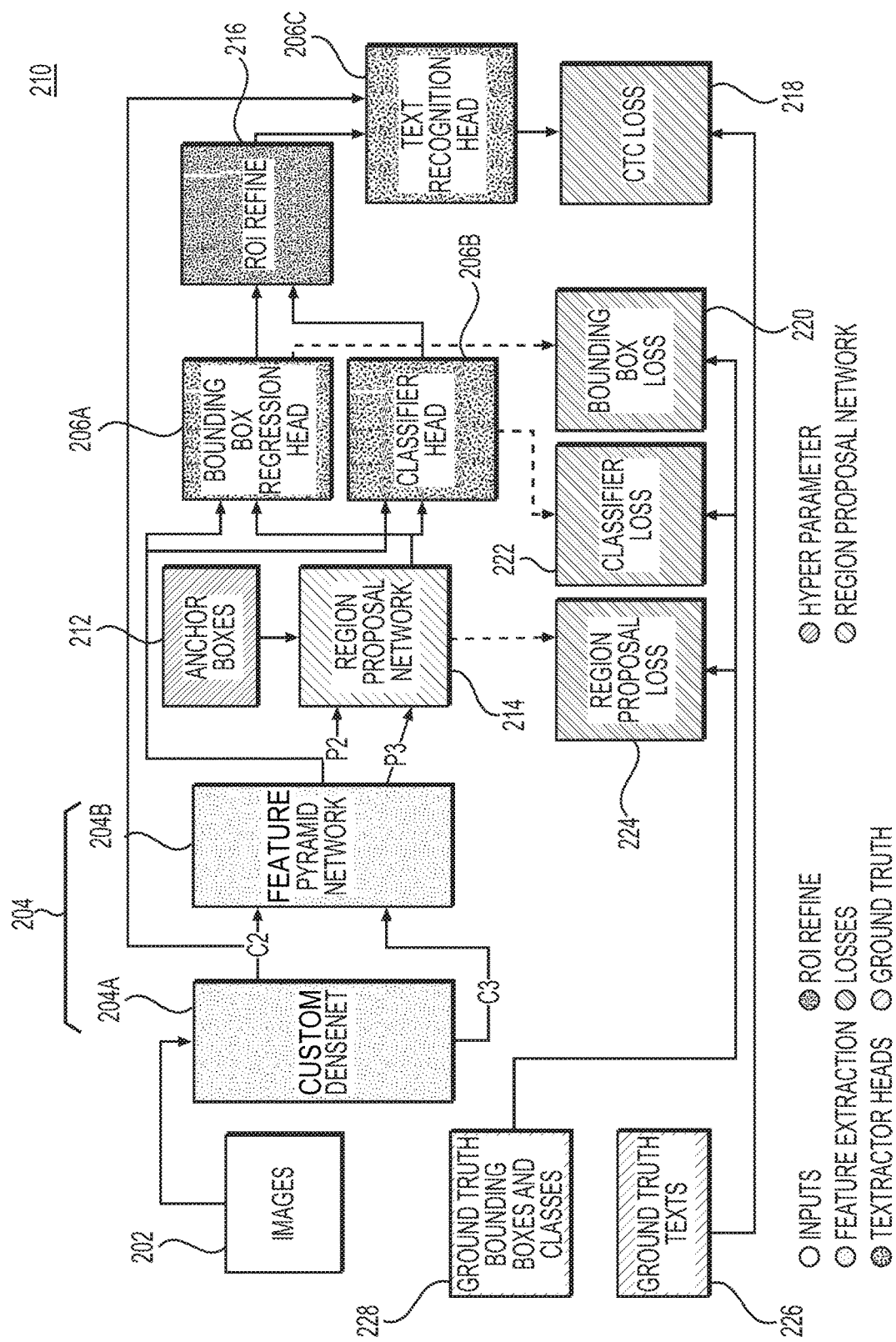
FIG. 2B depicts an exemplary block diagram of a system for text localization and recognition out of images, according to one or more embodiments.

FIG. 2B depicts an exemplary block diagram of a system 210 for text localization and recognition out of images, according to one or more embodiments. The system 210 may be or include a memory storing a text localization and recognition program, and a processor executing the text localization and recognition program to perform a text localization and recognition process. The text localization and recognition program may process an image through a TLaRNN to obtain predicted sequences of characters for text in an image. The TLaRNN may include a convolutional backbone 204 (with a convolutional stack 204A and a pyramid network 204B), a region proposal network 214, anchor boxes 212, a bounding box regression head 206A, a classifier head 206B, a RoI filtering bock 216, a text recognition head 206C, CTC loss 218, bounding box loss 220, classifier loss 222, region proposal loss 224, ground truth texts 226, and/or ground truth bounding boxes and classes 228. The system 210 may receive images 202 to be input to the convolutional backbone 204. The TLaRNN may be trained while it includes the anchor boxes 212, the CTC loss 218, the bounding box loss 220, the classifier loss 222, the region proposal loss 224, the ground truth texts 226, and/or the ground truth bounding boxes and classes 228. The TLaRNN may be deployed without the anchor boxes 212, the CTC loss 218, the bounding box loss 220, the classifier loss 222, the region proposal loss 224, the ground truth texts 226, and/or the ground truth bounding boxes and classes 228.

One of the main differences between TLaRNN and Mask R-CNN is the text recognition head 206C. In TLaRNN, MaskR-CNN's masking head has been replaced by a text recognition one. The text recognition head 206C receives filtered RoIs from the RoI filtering bock 216 and feature map(s) from the convolutional stack 204A, and predicts the corresponding character sequence of each RoI. The bounding box regression head 206A similar to Mask R-CNN generates RoIs deltas, but the classifier head 206B predicts the probability of containing text for each RoI, whereas in Mask R-CNN the classifier head predict the object's class, contained by each RoI.

Convolutional Stack

The convolutional stack 204A may be a ResNet, a Densely Connected Convolutional Networks (DenseNet), or a customized version of them. As depicted in FIG. 2B, the convolutional stack 204A may be a customized DenseNet. The images 202 may be input to the convolutional stack 204A. The output of the convolutional stack 204A may be multiple feature maps. These feature maps may correspond to the outputs of convolutional blocks at different depths in the convolution stack 204A. For instance, the feature map output from the first block of the convolutional stack 204A may be labeled C1 (not depicted), the feature map output from the second block of the convolutional stack 204A may be labeled C2, the feature map output from the third block of the convolutional stack 204A may be labeled C3, etc. The convolutional feature map(s) may be input into the pyramid network 204B.

Specifically, in contrast to Mask R-CNN, in the place of ResNet, and as one aspect of the disclosure, the convolutional backbone 204 includes a customized DenseNet, as described below in Table 1. In a convolutional stack such as DenseNet, the features extracted from earlier in the network (closer to the input) tend to have high spatial resolution (dense locational details), but have semantically weak features (less relational information about different parts of an image). In contrast, the features extracted from deeper in the network (farther from the input) have lost much of the locational information (low spatial resolution), but they have dense relational information about distant parts of an image (semantically strong features). Over many validation experiments, customized DenseNet may have a better performance for the TLaRNN, compared to ResNet/customized ResNet.

TABLE 1

Architecture of Customized DenseNet:

| Block Name | Layers | Output Size | Stack |
|---|---|---|---|
| C1 | Convolution | 448 × 448 | $\begin{bmatrix} 5 \times 5, 16, \text{stride } 2 \\ 3 \times 3, 32 \\ 3 \times 3, 64 \end{bmatrix} \text{conv} \times 1$ |
| | Pooling | 224 × 224 | 3 × 3 max pool, stride 2 |
| C2 | Dense Block 1 | 224 × 224 | $\begin{bmatrix} 1 \times 1 \\ 3 \times 3 \end{bmatrix} \text{conv} \times 6$ |
| | Transition Block | 224 × 224<br>112 × 112 | 1 × 1 conv<br>2 × 2 average pool, stride 2 |
| C3 | Dense Block 2 | 112 × 112 | $\begin{bmatrix} 1 \times 1 \\ 3 \times 3 \end{bmatrix} \text{conv} \times 12$ |

The customized DenseNet (the convolutional stack 204A) consists of three main blocks, presented as C1, C2 and C3 in Table 1 above. Each block consists of one or more identical convolutional blocks, stacked on top of each other. Each convolutional block is a sequence of convolutions with different properties (kernel size, feature size, stride length), which are presented as rows in brackets, in Table 1 above. In C1 each convolution is followed by a batch normalization layer (BN), and a nonlinear activation function layer (ReLU). In C2 and C3 each convolution is preceded by a BN layer and followed by a ReLU layer. Since each of C1, C2, and C3 blocks of the convolutional stack 204A, is a convolutional stack, their output is a convolutional feature map, which may be labeled as feature map C1, feature map C2, and feature map C3 correspondingly.

The pyramid network 204B may be the Feature Pyramid Network, discussed above. The feature pyramid network 204B may receive as inputs convolutional feature maps, such as the second convolutional feature map C2 and the third convolutional feature map C3. The feature pyramid network 204B may output one or more pyramid feature map(s). The one or more pyramid feature map(s) may correspond to a feature map output from a block of the pyramid network 204B. For instance, a first pyramid feature map output from a first block of the pyramid network 204B may be labeled P2 since it is constructed from aggregating feature map C2 and feature map C3; a second pyramid feature map output from a second block of the pyramid network 204B may be labeled P3. The pyramid network 204B may have a same or different number of blocks as the convolutional stack 204A. The pyramid feature map(s) (some or all) may be input to the region proposal network 214 and the detection heads of system 210 (e.g., bounding box regression head 206A and classifier head 206B). The pyramid network 204B may construct a top-down architecture that aggregate dense relational features of higher levels f the convolutional stack 204A with dense locational features of lower levels of the convolutional stack 204A. In this way, the feature pyramid network 204B may enable the region proposal network 214 to be more accurate.

The feature pyramid network 204B may benefit some components of the TLaRNN as compared to other components. For instance, output from the feature pyramid network 204B may tend to improve accuracy in the region proposal network 214 and in the classifier head 206B; however, for the text recognition head 206C, the output from the feature pyramid network 204B may have a deleterious effect. This may be caused by the sensitivity of the text recognition head 206C towards the noise added to the dense locational features by aggregating it with the dense relation features. Therefore, the architecture of the TLaRNN may have a blended role for the feature pyramid network 204B, as shown in FIG. 2B.

Specifically, the region proposal network 214, the bounding box regression head 206A, and classifier head 206B may receive pyramid feature map(s) input from the feature pyramid network 204B. More specifically, the region proposal network 214 may receive the whole pyramid (e.g., P2 and P3 pyramid feature maps), whereas the bounding box regression head 206A and the classifier head 206B may receive only the pyramid feature map closer to the input side of the pyramid network 204B, for instance just the P2 pyramid feature map. In contrast, the text recognition head 206C may receive feature maps from the convolutional stack 204A (e.g., feature map C2, as described below).

Region Proposal Network

The region proposal network 214 may be the same as the region proposal network 214, discussed above with respect to FIG. 2A. The region proposal network 214 may receive all of the pyramid feature maps (e.g., P2 and P3 pyramid feature maps) and may output proposals (e.g., a matrix of all the RoIs of six (6) numbers: two (2) scores, and four (4) coordinates of top and bottom corners for each RoI). The proposals may be input to the bounding box regression head 206A and the classifier head 206B.

The region proposal network 214 may receive the output of the convolutional backbone 204 (e.g., the pyramid feature maps). The region proposal network 214 may output the proposals using anchors (stored by the anchor boxes 212) and a sliding window.

For instance, an additional difference between the challenges posed in object detection and challenges posed in text localization and recognition may come from the large variety of aspect ratios inherent to blocks of text. The height of a text block may be determined by its font size, but the width may depend on both its font size and the length of the text content being represented (e.g., number of characters). Due to this, it may not be uncommon for a single image to contain text blocks composed of only a few characters, as well as text blocks containing long phrases and sentences. Being able to accommodate this diversity of object sizes and aspect ratios (all within the same object class) may be an important divergence from typical tasks in object detection. Therefore, the anchor boxes 212 may be based on wider range of aspect ratios. For instance, the aspect ratio of the anchor boxes 212 may be 1, 2, or 4. This same problem may also be addressed below with respect to pooling dimensions.

Bounding Box Regression Head and Classifier Head

The bounding box regression head 206A and the classifier head 206B may each receive proposals from the region proposal network 214, and may each receive pyramid feature maps from the feature pyramid network 204B. Specifically, as depicted in FIG. 2B, the bounding box regression head 206A and the classifier head 206B may each receive (1) proposals from the region proposal network 214, and (2) the P2 pyramid feature map from the feature pyramid network 204B.

The bounding box regression head 206A may be a bounding box regression network. The bounding box regression head 206A may output a set of deltas on the given RoIs that might contain text. The classifier head 206B may be a neural network that estimates the probability of containing text for each predicted RoI. Specifically, in this case, the classifier head 206B may perform a binary classification between text and background.

RoI Filtering Block

The RoI filtering block 216 may receive the RoIs' deltas from the bounding box regression head 206A, the predicted probability from the classifier head 206B, and RoIs from the region proposal network 214. The RoI filtering block 216 may select one or more RoIs based on the predicted probabilities and construct the final RoIs by applying the predicted deltas to the selected RoIs. The RoI filtering block 216 may be called RoIRefine.

Specifically, since the text recognition head 206C may be a resource intensive process, it may be beneficial to consider only RoIs that may be considered optimum candidate RoIs for recognition. For instance, as one aspect of the disclosure, and to reduce the TLaRNN processing foot-print during training and inference, the TLaRNN may filter predicted RoIs of the region proposal network 214, based on the predicted probabilities of the classifier head 206B (e.g., only keeping the RoIs that a high probability of containing text has been predicted for them), to obtain remaining RoIs. The remaining RoIs may be filtered based on the predicted probabilities by the classifier head and a predefined threshold (any RoIs with a predicted probability less than the threshold will be omitted). Alternatively, the remaining RoIs above the threshold may have a non-maximal suppression applied to them to generate the final RoIs. The final RoIs may be used by the text recognition head 206C.

In this manner, the resource intensive text recognition head 206C is applied to a smaller set of RoIs (instead of the entire set of RoIs), and training and inference time may be reduced for the TLaRNN. Moreover, at training time, the RoI filtering as described above for the RoI filtering block 216 may be useful during early training epochs. Specifically, as the TLaRNN is only passing relatively high quality RoIs to the text recognition head 206C, the TLaRNN may be preventing the text recognition head 206C from corrupting the feature maps, during the early training steps (early epochs). For instance, if low quality RoIs are passed to the text recognition head 206C, the TLaRNN may be forcing the text recognition head 206C to detect characters in regions that there are none, which may consequently corrupt the feature maps.

Text Recognition Head

The text recognition head 206C may be a neural network. The text recognition head 206C may receive the output of the convolutional backbone 204 (e.g., the convolutional feature map(s)) and the RoIs from the RoIs filtering block 216. The text recognition head 206C may, for each RoI, produce a predicted character sequence corresponding to the text inside each RoI. The TLaRNN may use a CTC loss 218 for training the text recognition head 206C.

In contrast to Mask R-CNN, the TLaRNN may, instead of a masking head, include the text recognition head 206C. The text recognition head 206C may include two main components: a feature extraction mechanism designed for text recognition (which may be called RoIRecognitionAlign or RoIreclign), and text recognition stack.

As mentioned above, in text localization and recognition one usually has only two classes: text, and background. As a result, one may be assigning many independent lines of texts to the same class (text), no matter how long they are, or what their font sizes are. Due to this, one may encounter a large variety of aspect ratios for the same class of object (text), and may not treat them the same way. In Mask R-CNN, large objects are separated from small ones by pooling features of larger objects from the top of the feature pyramid, and pooling features of small objects from the bottom of the pyramid. Since the top levels of the feature pyramid have greater strides, it is sufficient to resize extracted features for all the objects to the same dimensions. However, to distinguish different characters in an image, high spatial resolution details need to be available in the feature maps. Thus, text recognition may place a more stringent requirement on feature representation than is required for object detection alone. As a result, the previously used techniques of pooling the features of larger object (texts) from the top of feature pyramid may not be applied here. This may result in low spatial resolution information and may degrade the models ability to accurately recognize the characters.

Considering these challenges, the RoIreclign of the text recognition head 206C may pool the features of every final RoI, no matter how big or small, from a feature map of the second convolutional block (e.g., the C2 block) of the convolutional stack 204A. For instance, the RoIreclign may retain the high spatial resolution information that would be required to accurately recognize the characters of localized texts. The feature map of the C2 block may have a balance of relational and spatial features, which may be beneficial for text recognition.

Furthermore, the RoIreclign of the text recognition head 206C may need to address the problem of diverse aspect ratios for the final RoIs. For instance, a fix-size feature extraction (resize the extracted features of every RoI to the same fixed size) may corrupt text features by stretching short texts and compressing long texts. The RoIreclign may dynamically resize (conserving the aspect ration) and pad the extracted features of every RoIs to have the same shape.

Specifically, the RoIreclign may receive the feature map of the C2 block and the final RoIs as inputs, and output resized and padded extracted features of every RoIs). The RoIreclign may define a fixed height ($H_o$) and fixed width ($W_o$) for its output. Based on the ratio of the output height $H_o$ to the height of each final RoI ($H_{roi}$) and height to width ratio of each final RoI, the RoIreclign may calculate a re-sized width ($W_r$) for each final RoI, and re-size the extracted features to the output height $H_o$ and the calculated width $W_r$. For instance, the OCR pooling mechanism may use the following equations: Equation 1-3.

$$H_r = H_o \qquad \text{Equation 1}$$

$$W_r = W_{roi} \cdot x \frac{H_r}{H_{roi}} \qquad \text{Equation 2}$$

$$W_p = W_o - W_r \qquad \text{Equation 3}$$

Padding width ($W_p$) of each final RoI may be calculated based on the output width and the calculated resize width for that RoI, and the re-sized extracted features may be padded if required (e.g., if $W_o$ is greater than $W_r$). The output width $W_o$ may dictate a maximum number of characters that the TLaRNN may detect for any given line of text. In this manner, the TLaRNN may preserve a natural aspect ratio of the extracted features and not stretch/shrink disproportionately. In implementation, a typical height and width of RoIreclign's output for a final RoI may be either (5×180), (6×224) or (7, 300).

By having the dynamic resizing, the RoIreclign may re-scale every text to a consistent representational font size. Therefore, as a result, the TLaRNN may be used to recognize text characters of every localized text block, independent of its font size. Dynamic re-sizing may also accomplish a similar goal as extracting features of every RoI from different levels of a feature pyramid based on its size.

The recognition stack of the text recognition head 206C may be a neural network. For instance, a technique for text recognition within each RoI, may be to crop the input image 202 according to the RoI, and use that image crop as the input to the recognition stack of the text recognition head 206C. In contrast, the TLaRNN may use generated features from the convolutional stack 204A as the input to the text recognition head 206C. Specifically, as discussed above, the feature map of C2 block may be input to the RoIreclign, and the output of the RoIreclign may be input to the recognition stack. Therefore, the recognition stack may receive a richer feature set, and as a result, it may be possible to accomplish the recognition task faster and less resource intensive.

In addition, the relational information detected by the recognition stack of the text recognition head 206C may be back propagated to the convolutional backbone 204 (e.g., the convolutional stack 204A), and improves its features accordingly. This may ensure that the representations leveraged by all three heads (e.g., the bounding box regression head 206A, the classifier head 206B, and the text recognition head 206C) take into account the tasks performed at each of the heads, thereby allowing the heads to jointly optimize each other and not work independently and redundantly.

The inputs to the text recognition head 206C may be initially transformed by the RoIreclign. For each RoI, this results in a consistently-shaped extracted features (height× width×channels); in one aspect of the disclosure the shape of the features extracted for each RoI may be either (5×180× 256), (6×200×256) or (7×300×256). The extracted features for each RoI is then input into the recognition stack, and the output of the recognition stack is a predicted character sequence over an acceptable character set of the recognition stack. The acceptable character set may contain ninety-four (94) characters as follows: "0 . . . 9 A . . . Z a . . . z ! " # $ % & ') (* +, −. / : ; < = > ? @ [ ] { }". The text recognition head 206C results presented below may be created with no lexicon or language model.

The text recognition stack may include neural network classes such as recurrent neural network (RNN), and convolutional neural network (CONV). The text recognition stack may instead include an attention neural network (ATTN) or a Sigmoid-Multiplied neural network (Sigmoid-Multi).

In one aspect of the disclosure, the recognition stack may use an RNN to translate the extracted features of every RoI to a character sequence. From the extracted features of every RoI by RoIreclign, a 2D convolution may be applied (e.g., with kernel size of 5×3×channels). The kernel size may be chosen to capture a typical character size, as represented in the normalized form that may be output by the RoIreclign. The output of the 2D convolution (e.g., with a shape of 1×180×256) may be input into an RNN block. The RNN block may consist of a bidirectional gated recurrent unit (GRU). The output of the RNN block may be sent through a softmax activation function over the size of acceptable character set, with one prediction per each feature column (horizontal step) therefore typically of a shape of 180×94.

In another aspect of the disclosure, the recognition stack may use a convolutional stack to translate the extracted features of every RoI to a character sequence. From the extracted features for every RoI by RoIreclign input, a 2D convolution may be applied (e.g., with kernel size of 5×3× channels). The kernel size may be chosen to capture a typical character size, as represented in the normalized form that may be output by RoIreclign. The output of the 2D convolution (e.g., with a shape of 1×180×256) may be input into a convolution with a kernel shaped so as to capture multiple feature columns (horizontal steps). The convolution captures the required features to predict the character at each horizontal step. The output of the convolution may be squeezed to drop the dimension of one (first dimension) and then may be sent through a densely connected neural network layer (dense layer) with a softmax activation function over the acceptable character set, with one prediction per each feature column (horizontal step), therefore typically of a shape of 180×94.

In another aspect of the disclosure, the recognition stack may utilize an attention mechanism to improve the accuracy of the text recognition head 206C. Specifically, in one aspect of the disclosure, similar to using a convolutional stack to translate the extracted features of every RoI to a character sequence, the Sigmoid-Multi neural network may apply a 2D convolution to the output of RoIreclign input (e.g., with kernel size of 5×3×channels). The kernel size may be chosen to capture a typical character size, as represented in the normalized form that may be output by RoIreclign. The output of the 2D convolution (e.g., with a shape of 1×180× 256) may be input into a convolution with a kernel shaped (e.g., 1×3) so as to capture multiple feature columns (horizontal steps). The convolution captures the required features to predict the character at each horizontal step. The output of the convolution may be squeezed to drop the dimension of one (first dimension). The squeezed feature map may be input to a densely connected neural network layer (dense layer) with a sigmoid activation and feature length of 1. This dense layer is the attention mechanism, which predict which feature columns should be emphasized and which ones should be emphasized to have a better character sequence prediction. Then a pointwise product of the output of the squeezed layer and attention output is calculated, and passed as input to a dense layer with a softmax activation function over the acceptable character set, with one prediction per each feature column (horizontal step), therefore typically of a shape of 180×94.

These different recognition architectures may be tested with an end-to-end text localization and recognition neural network that includes a ResNet backbone. In the case of a ResNet backbone, the convolutional neural network case may perform better than other convolutional approaches, as well as all recurrent network approaches discussed above.

Training Data

The training data may include the ground truth texts 226 and the ground truth bounding boxes and classes 228. The ground truth texts may include a true text-string for each text-string in a training document. Ground truth bounding boxes and classes 228 may include a true bounding box for each text block in a training document image.

Specifically, the training data may include synthetic training document images. For instance, relying on hand-labeled documents would prove too time consuming to reach a large enough sample size, and large sample sets of pre-existing training data for non-traditional OCR may not exist. Therefore, synthetic training document images may include many of the features inherent to real world complex document images. These features may include one or more of: multiple fonts (e.g., more than 40 fonts), multiple font sizes, randomized text segments, randomized text lengths, mathematical symbols, randomized text colors and background colors, randomized horizontal and vertical gaps between different text block, randomized text orientation and tilt, image noise and blur, as well as the inclusion of "distraction" objects such as geometric shapes, lines, and graphs.

Loss

The TLaRNN may determine loss by using the bounding box loss 220, the classifier loss 222, region proposal loss 224, and the CTC loss 218 (collectively referred to herein as "loss functions"). The loss functions may compare the true text, bounding boxes, and classifications included in the training data to the predicted text, bounding box, and classification of the multi-task network. Various methods are available to calculate and incorporate the comparison of the loss functions to update the TLaRNN. In one aspect of the disclosure, a total loss may be calculated by summing the four losses from the loss functions.

Training Procedure

The training procedure for TLaRNN described herein may consist of ten-thousand (10,000), or more, synthetic document images with a batch size of 2 per GPU. Model parameters update based on the loss gradient may be optimized by stochastic gradient descent (SGD): a learning rate of 0.001 with momentum of 0.9 may be used for a first 700 epochs, and then switched to momentum of 0.5. All training may be conducted with an NVIDIA GeForce 1080 pi.

For evaluation with the ICDAR dataset (see below), the model may then be fine-tuned with the provided training dataset (100 images) for 10 additional epochs. The TLaRNN may perform text localization and text recognition comparably better than other existing techniques on an image of a complete document. Moreover, certain configurations of the TLaRNN may perform comparably better than other configurations. For instance, for text recognition, an attention assisted convolutional architecture for the text recognition head 206C may perform better than other architectures discussed herein. For end-to-end text recognition (e.g., an f-score), the results may vary; however, the attention assisted convolutional architecture may lead to improved performance over the convolutional and recurrent architectures alone. Moreover, a DenseNet convolutional stack in the backbone of the TLaRNN may perform better, in end-to-end (e.g., the f-score) performance, for recognition as compared to a ResNet backbone multi-task network. Lastly, the TLaRNN may perform favorably compared to existing techniques, as the combination of text localization and text recognition may accurately identify text segments of variable length and distinguish text segments, even if the text segments are relatively close to each other.

Figures 2C, 2D:
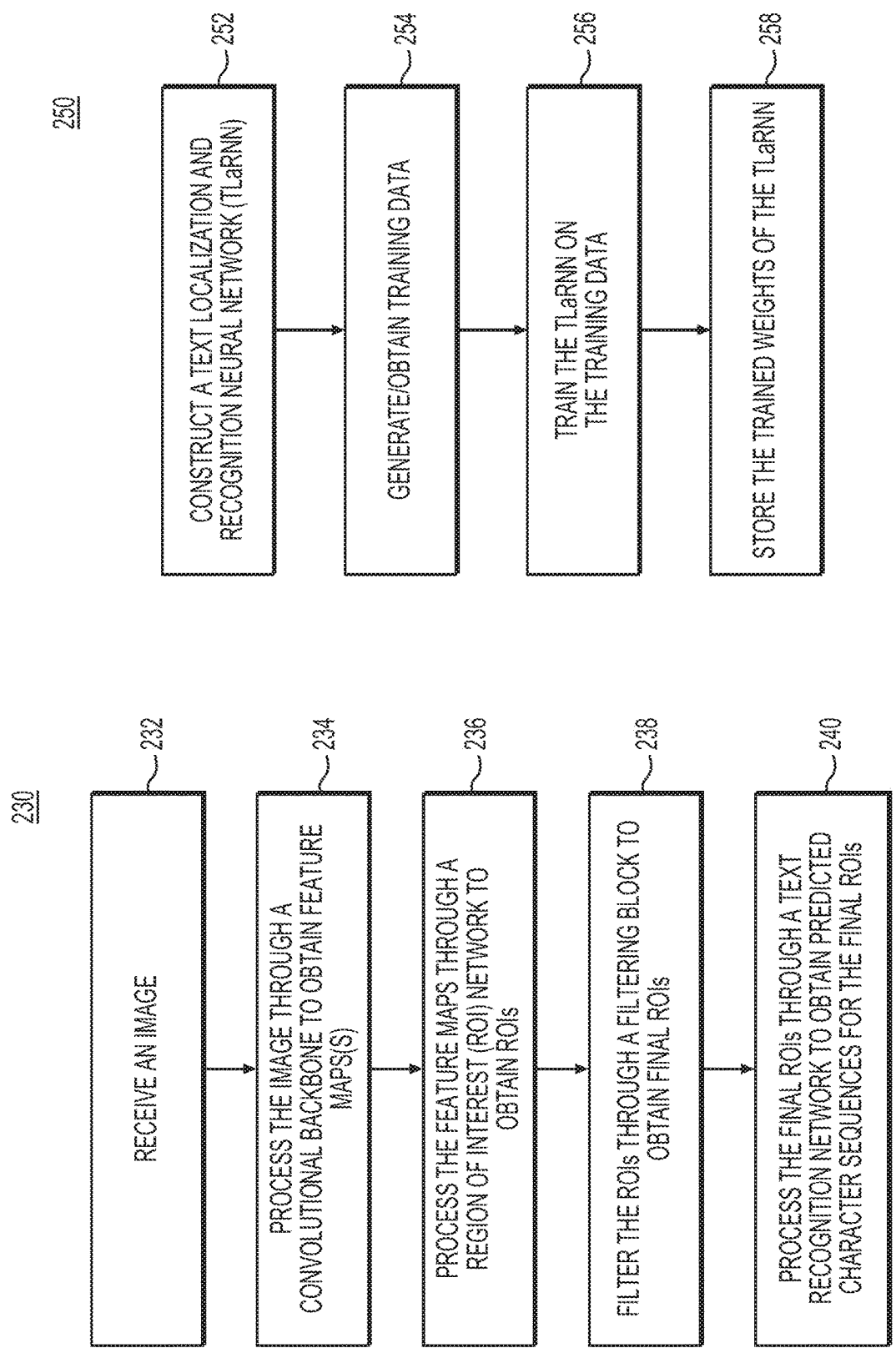
FIG. 2C depicts a flowchart for text localization and recognition out of images, according to one or more embodiments.
FIG. 2D depicts a flowchart for training a TLaRNN, according to one or more embodiments.

FIG. 2C depicts a flowchart 230 for text localization and recognition out of images, according to one or more embodiments. The flowchart 230 may depict a process to localized and recognize text from images. The flowchart 230 may be performed by the system 200 or system 210, discussed above, by executing the text localization and recognition program. The system 200, 210 may start the process of the text localization and recognition program illustrated by flowchart 230 to receive an image (block 232). The system 200, 210 may proceed to process the image through a convolutional backbone to obtain feature maps(s) (block 234). The system 200, 210 may proceed to process the feature maps through a region of interest (RoI) network to obtain RoIs (block 236). The system 200, 210 may proceed to filter the RoIs through a filtering block to obtain final RoIs (block 238). The system 200, 210 may proceed to process the final RoIs through a text recognition network to obtain predicted character sequences for the final RoIs (block 240).

FIG. 2D depicts a flowchart 250 for training the TLaRNN, according to one or more embodiments. The flowchart 250 may depict a process to create and train the TLaRNN. The flowchart 250 may be performed by the system 200 or system 210, discussed above. The system 200, 210 may start the process illustrated by flowchart 250 to construct the TLaRNN (block 252). The system 200, 210 may proceed to generate/obtain training data (block 254). The system 200, 210 may proceed to train the TLaRNN on the training data (block 256). The system 200, 210 may proceed to store the trained weights of the TLaRNN (block 258).

Figure 3A:
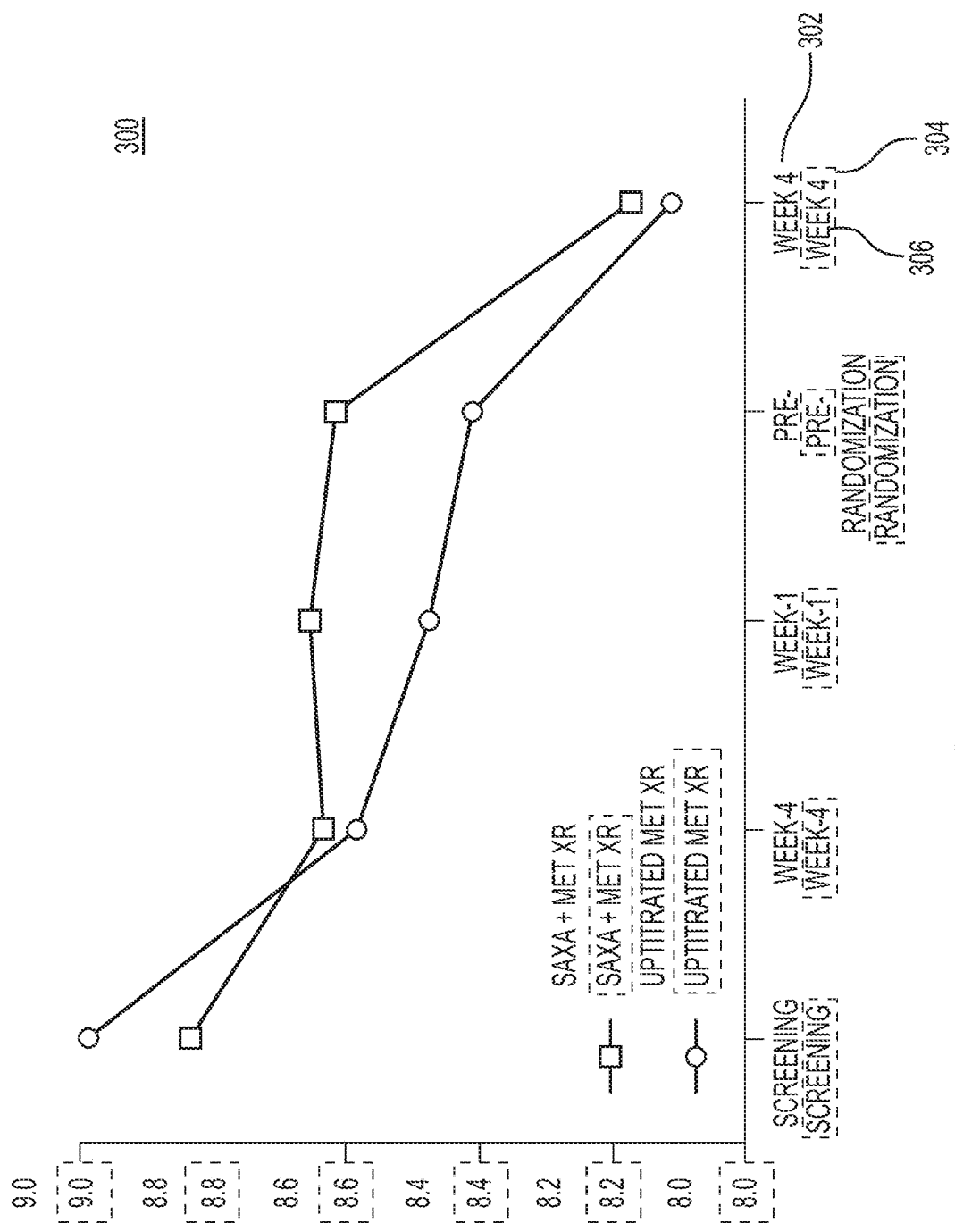
Figure 3B:
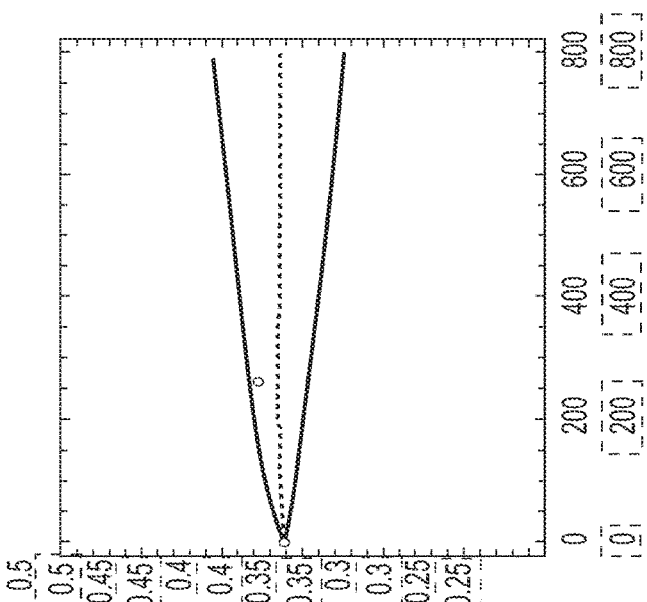
Figure 3D:
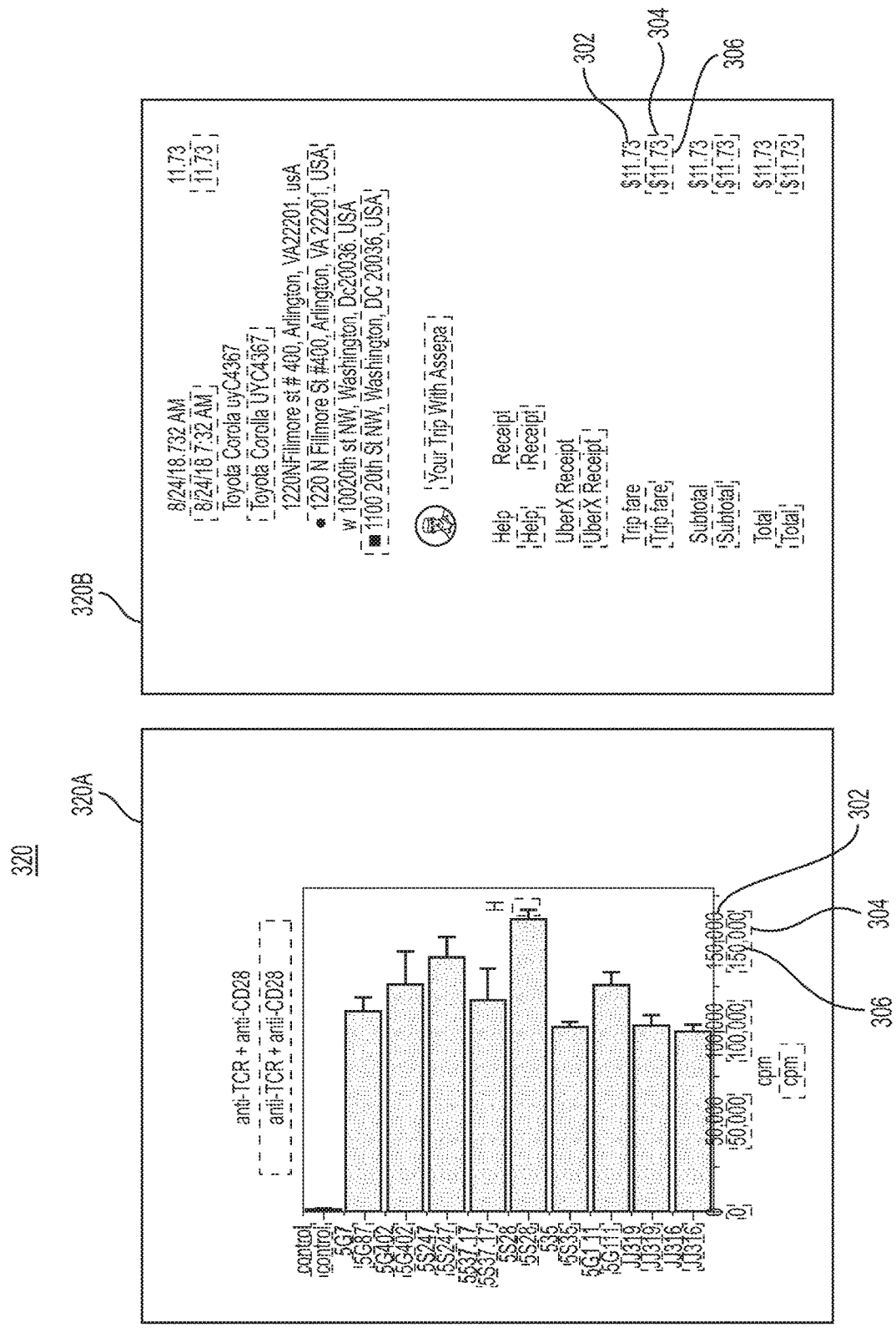

FIGS. 3A-3D depict output results of the TLaRNN for localization and recognition of text from images, according to one or more embodiments. Specifically, FIG. 3A may depict results 300 of the TLaRNN of the present disclosure on a sample image from ICDAR De-TEXT challenge. FIG. 3B may depict results 310 of the TLaRNN on another sample image from ICDAR De-TEXT challenge 310A and a sample from the synthetic training documents 310B. FIG. 3C may depict results 315 of the TLaRNN on a photograph of a receipt. FIG. 3D may depict results 320 of the TLaRNN on another sample image from ICDAR De-TEXT challenge 320A and a screenshot of a receipt from a ride sharing app 320B.

One or more distinct segments of text 306 may be identified, apart from background pixels and other image objects, as indicated by one or more boxes 304. The boxes 304 may indicate bounding boxes (e.g., as indicated the RoIs discussed above). Text 302 on top of each box may be the output of the text recognition head 206C.

Furthermore, with respect to FIG. 3C, the input image of a receipt presents interesting challenges for text localization and recognition of images. First, the document of interest occurs alongside some background objects (e.g., a steering wheel, not depicted). Second, the text within the document is highly unstructured and therefore it is beneficial to separately identify all the possible text blocks. In this case, the output of the multi-task network is overlaid on the image above. Specifically, distinct segments of text 306 may be identified, apart from background pixels and other image objects, as indicated by one or more boxes 304.

Moreover, in another aspect of the disclosure, the TLaRNN may also include a pixel mask head (e.g., a pixel mask neural network), which creates a pixel mask for the identified text. Moreover, adjacent to each box 304 may be a predicted probability of having text in that box. Notably, the bounding boxes are tight (e.g., close spatially to the text within a threshold distance of pixels from pixels that correspond to the text) and encapsulate the text regions accurately (e.g., are not over or under inclusive of background space or other objects of the image). While the pixel masks may not be inherently required for text recognition, including this constraint in the multi-task learning forces the localization (e.g., the bounding box regression) to be even more accurate.

Figure 4:
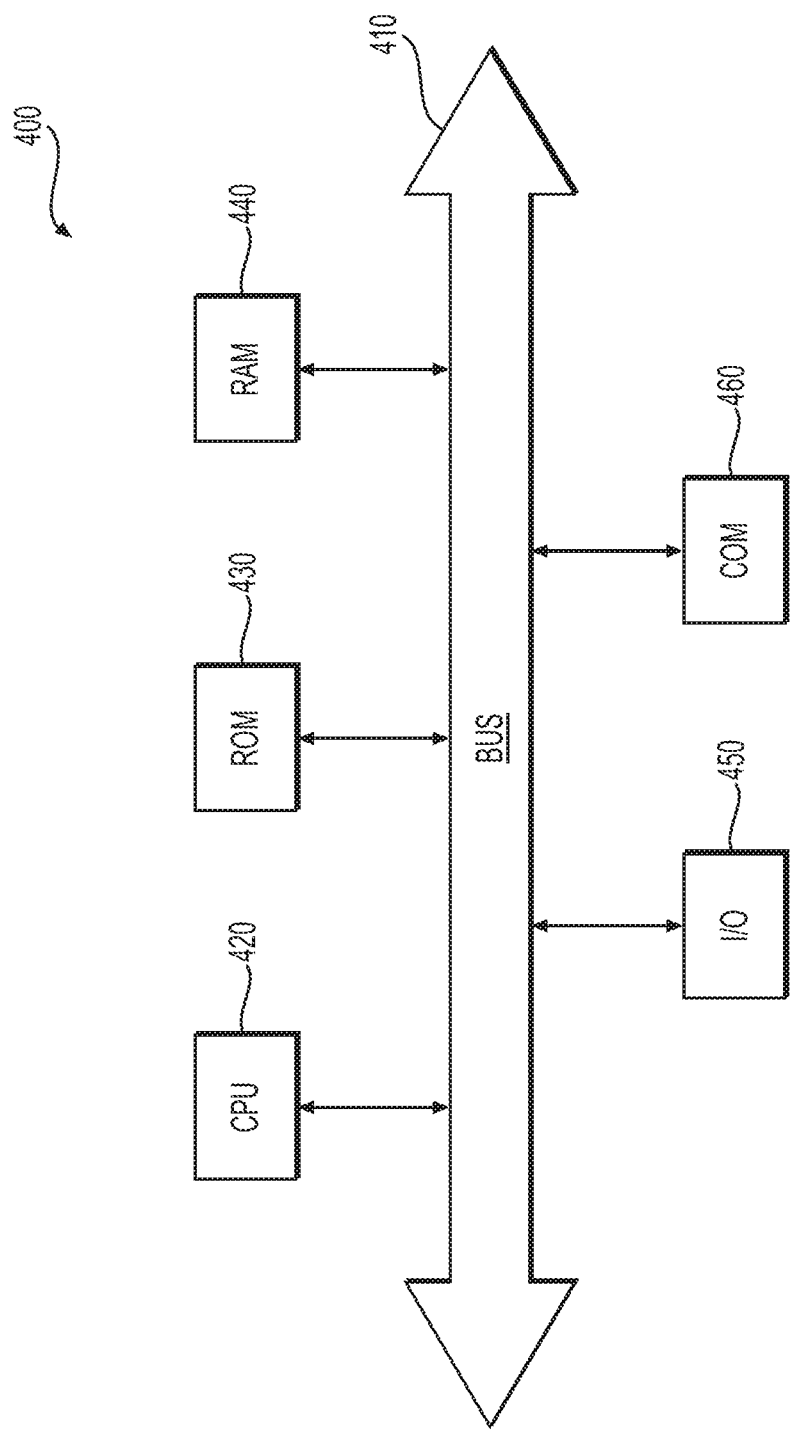
FIG. 4 depicts an example system that may execute techniques presented herein.

FIG. 4 depicts an example system that may execute techniques presented herein. FIG. 4 is a simplified functional block diagram of a computer that may be configured to execute techniques described herein, according to exemplary embodiments of the present disclosure. Specifically, the computer (or "platform" as it may not be a single physical computer infrastructure) may include a data communication interface 460 for packet data communication. The platform may also include a central processing unit ("CPU") 420, in the form of one or more processors, for executing program instructions. The platform may include an internal communication bus 410, and the platform may also include a program storage and/or a data storage for various data files to be processed and/or communicated by the platform such as ROM 430 and RAM 440, although the system 400 may receive programming and data via network communications. The system 400 also may include input and output ports 450 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for localization and recognition of text from images, comprising:
    obtaining a text localization and recognition neural network (TLaRNN), the TLaRNN including:
        a convolutional backbone connected to a region of interest (RoI) network;
        the RoI network connected to a filtering block; and
        the filtering block connected to a text recognition network;
    obtaining an image, the image being a complex document; and
    processing the image through the TLaRNN to obtain predicted character sequences,
    wherein
        the convolutional backbone includes, in series, a first convolutional stack and a feature pyramid network,
        the RoI network includes, in series, a region proposal network and a bounding box and classifier network,
        the bounding box and classifier network includes, in parallel, a bounding box regression head and a classifier head, and
    wherein proposals from the region proposal network and at least one pyramid feature map from the feature pyramid network are input to the bounding box regression head and the classifier head of the bounding box and classifier network.

2. The method of claim 1, wherein
    the text recognition network includes, in series, a feature extraction mechanism and a text recognition stack,
    at least one convolutional feature map from the first convolutional stack is input to the feature extraction mechanism,
    the feature extraction mechanism outputs extracted feature maps,
    the extracted feature maps are input to the text recognition stack, and
    the text recognition stack outputs the predicted character sequences.

3. The method of claim 1, wherein
    the image is input to the first convolutional stack,
    the first convolutional stack outputs convolutional feature maps,
    the convolutional feature maps are input to the feature pyramid network, and
    the feature pyramid network outputs pyramid feature maps including the at least one pyramid feature map.

4. The method of claim 3, wherein the first convolutional stack is a residual neural network (ResNet), a densely connected convolutional network (DenseNet), or a customized DenseNet.

5. The method of claim 3, wherein
    the pyramid feature maps are input to the region proposal network,
    the region proposal network outputs the proposals,
    the bounding box regression head outputs deltas on predicted regions of interest (RoIs) for the proposals, and
    the classifier head outputs classification probabilities of containing text for the proposals.

6. The method of claim 5, wherein
    the bounding box regression head is a bounding box regression network, and
    the classifier head is a classification network.

7. The method of claim 5, wherein the at least one pyramid feature map is from a block closer to an input side than an output side of the feature pyramid network or from a middle block of the pyramid network.

8. The method of claim 5, wherein
    the RoIs, the deltas, and the classification probabilities are input to the filtering block, and
    the filtering block outputs final RoIs.

9. The method of claim 8, wherein
    the text recognition network includes, in series, a feature extraction mechanism and a text recognition stack,
    the final RoIs and at least one of the convolutional feature maps are input to the feature extraction mechanism,
    the feature extraction mechanism outputs extracted feature maps,
    the extracted feature maps are input to the text recognition stack, and
    the text recognition stack outputs the predicted character sequences for the final RoIs.

10. The method of claim 9, wherein the at least one of the convolutional feature maps is from a block closer to an input side than an output side of the first convolutional stack or from a middle block of the first convolutional stack.

11. The method of claim 9, wherein the text recognition stack is a recurrent neural network, a second convolutional neural network, or an attention assisted convolutional stack.

12. A system for extraction of text from images, the system comprising:
    a memory storing instructions; and
    a processor executing the instructions to perform a process including:
        receiving an image, the image being a complex document;
        processing the image through a convolutional backbone to obtain feature maps;
        processing the feature maps through a region of interest (RoI) network to obtain RoIs;
        filtering the RoIs through a filtering block to obtain final RoIs; and
        processing the final RoIs through a text recognition network to obtain predicted character sequences for the final RoIs,
    wherein
        the convolutional backbone includes, in series, a first convolutional stack and a feature pyramid network,
        the RoI network includes, in series, a region proposal network and a bounding box and classifier network,
        the bounding box and classifier network includes, in parallel, a bounding box regression head and a classifier head, and
    wherein proposals from the region proposal network and at least one pyramid feature map from the feature pyramid network are input to the bounding box regression head and the classifier head of the bounding box and classifier network.

13. The system of claim 12, wherein
the text recognition network includes, in series, a feature extraction mechanism and a text recognition stack,
at least one convolutional feature map from the first convolutional stack is input to the feature extraction mechanism,
the feature extraction mechanism outputs extracted feature maps,
the extracted feature maps are input to the text recognition stack, and
the text recognition stack outputs the predicted character sequences.

14. The system of claim 12, wherein to process the image through the convolutional backbone to obtain the feature maps, the process further includes:
inputting the image to the first convolutional stack,
processing the image through the first convolutional stack to output convolutional feature maps,
inputting the convolutional feature maps to the feature pyramid network, and
processing the convolutional feature maps through the feature pyramid network to output pyramid feature maps including the at least one pyramid feature map.

15. The system of claim 14, wherein to process the feature maps through the RoI network to obtain the RoIs, the process further includes:
inputting the pyramid feature maps to the region proposal network,
processing the pyramid feature maps through the region proposal network to output the proposals,
inputting the proposals and the at least one pyramid feature map to the bounding box regression head and the classifier head of the bounding box and classifier network,
processing the proposals and the at least one pyramid feature map through the bounding box regression head to output deltas on the RoIs, and
processing the proposals and the at least one pyramid feature map through the classifier head to output classification probabilities probability of containing text for the proposals.

16. The system of claim 15, wherein the at least one pyramid feature map is from a block closer to an input side than an output side of the pyramid network or from a middle block of the pyramid network.

17. The system of claim 15, wherein the filtering block includes a RoI selection network, and, to filter the RoIs through the filtering block to obtain the final RoIs, the process further includes:
inputting the RoIs, the deltas, and the classification probabilities to the RoI selection network, and
processing the deltas, the RoIs, and the classification probabilities through the RoI selection network to output the final RoIs.

18. The system of claim 17, wherein the text recognition network includes, in series, a feature extraction mechanism and a text recognition stack, and, to process the final RoIs through the text recognition network to obtain the predicted character sequences for the final RoIs, the process further includes:
inputting the final RoIs and at least one of the convolutional feature maps to the feature extraction mechanism,
processing the final RoIs and the at least one of the convolutional feature maps through the feature extraction mechanism to output corresponding feature crops,
inputting the feature crops to the text recognition stack, and
processing the feature crops through the text recognition stack to output the predicted character sequences for the final RoIs.

19. The system of claim 18, wherein the at least one of the convolutional feature maps is from a block closer to an input side than an output side of the first convolutional stack or from a middle block of the first convolutional stack.

20. A method for localization and recognition of text from images, comprising:
receiving an image, the image being a complex document;
processing the image through a convolutional backbone to obtain feature maps(s);
processing the feature maps through a region of interest (RoI) network to obtain RoIs;
filtering the RoIs through a filtering block to obtain final RoIs; and
processing the final RoIs through a text recognition network to obtain predicted character sequences for the final RoIs,
wherein the convolutional backbone includes, in series, a convolutional stack and a feature pyramid network,
wherein the RoI network includes, in series, a region proposal network and a bounding box and classifier network, the bounding box and classifier network includes, in parallel, a bounding box regression head and a classifier head, and
wherein proposals from the region proposal network and at least one pyramid feature map from the feature pyramid network are input to the bounding box regression head and the classifier head of the bounding box and classifier network.

* * * * *